United States Patent
Raynor

(10) Patent No.: US 7,486,275 B2
(45) Date of Patent: Feb. 3, 2009

(54) OPTICAL POINTING DEVICE

(75) Inventor: Jeffrey Raynor, Edinburgh (GB)

(73) Assignee: STMicroelectronics Ltd., Marlow-Buckinghamshire (GB)

(*) Notice: Subject to any disclaimer, the term of this patent is extended or adjusted under 35 U.S.C. 154(b) by 877 days.

(21) Appl. No.: 10/978,925

(22) Filed: Nov. 1, 2004

(65) Prior Publication Data
US 2005/0134567 A1 Jun. 23, 2005

(30) Foreign Application Priority Data
Nov. 11, 2003 (EP) ............................ 03257096

(51) Int. Cl.
*G09G 5/08* (2006.01)
(52) U.S. Cl. .................. 345/163; 345/160
(58) Field of Classification Search ......... 345/156–167, 345/175, 179–183; 178/18.01, 18.09–19.07
See application file for complete search history.

(56) References Cited

U.S. PATENT DOCUMENTS 6,281,882 B1  8/2001  Gordon et al. ............... 345/166
6,995,748 B2 * 2/2006 Gordon et al. ............... 345/166
7,298,359 B2 * 11/2007 Kim et al. .................... 345/158
2002/0185617 A1 12/2002 Oliver et al. ............. 250/559.22

FOREIGN PATENT DOCUMENTS

EP    1255219    11/2002
EP    1283493    2/2003
EP    1313062    5/2003

* cited by examiner

*Primary Examiner*—Richard Hjerpe
*Assistant Examiner*—Mansour M Said
(74) *Attorney, Agent, or Firm*—Lisa K. Jorgenson; Allen, Dyer, Doppelt, Milbrath, Gilchrist, P.A.

(57) ABSTRACT

An optical pointing device includes a variable frame rate controller to reduce power consumption. Frame rate can be varied through analog devices by varying the reference current, or through digital devices by varying the length of time between successive frames. The variable frame rate controller can accept input from various measurements such as velocity of the device, or a spatial frequency of the surface on which the device is situated.

19 Claims, 3 Drawing Sheets

OPTICAL POINTING DEVICE

FIELD OF THE INVENTION

The present invention relates to optical pointing devices, and in particular, but not exclusively, to an optical pointing device with a reduced power consumption.

BACKGROUND OF THE INVENTION

Traditionally, pointing devices for use with computer systems, or other systems with a graphical user interface, have been in the form of a computer mouse. These devices have become so widespread that computer users have become familiar with the manner in which they are used in conjunction with a graphical user interface.

Optical pointing devices have been developed to overcome a number of shortcomings associated with a more traditional mechanical computer mouse. A mechanical computer mouse has a housing on its bottom surface in which a rubber coated steel ball is situated. When the mouse is moved in a particular direction across a surface the ball rolls in the same direction. Inside the housing there are two rollers, or wheels, spring loaded such that they are always in contact with the surface of the ball. One roller is positioned to roll only in a forwards and backwards direction, relative to the center of the mouse, and one in a left to right direction, relative to the center of the mouse. The rollers convert the movement of the mouse into electrical signals representing forward/backward movement and left/right movement. Usually, the conversion from mechanical movement of the rollers to electrical signals is effected by having a shaft encoder on each roller. A light source is placed on one side of the shaft encoder and a photodetector on the other. When the shaft encoder is rotated by the roller the emitted light from the source passes through the slits of the shaft encoder, effectively pulsing light to the photodetector and therefore giving a digital representation of the movement of the mouse.

Since this conversion to electrical signals is mechanical, a number of problems arise. Firstly, lint and dirt, over time, are picked up by the rubber ball and deposited on the rollers and inside the body of the mouse. This impinges on the performance of the mouse to the extent that a roller will stop turning. Although the rubber ball may be removed and the rollers cleaned, this is usually a tricky and unpleasant task. Second, the surface of the rubber ball or the surface of a mouse pad may become worn or damaged. This can lead to inconsistent movement of the onscreen pointer and can lead to frustration during operation of the mouse.

Optical pointing devices were designed to overcome these shortcomings. A modern optical mouse has no moving parts for conversion of movement to electrical signals and requires no special surface to operate on. In fact, apart from smooth glass, optical mice can operate on virtually any flat surface.

Generally, an optical mouse has a infrared (IR) light emitting diode (LED) light source positioned at a low angle of incidence with the flat surface on which the mouse is sitting. The surface below, when illuminated at this low angle of incidence, provides many physical features which are communicated in the reflected IR light and focused onto a pixel array in the mouse. Each pixel is then digitized and together this information provides a snapshot or frame of the surface below.

The pixel array is read out at regular intervals producing successive frames. Each frame is compared to the frame immediately previous and the direction of movement can then be inferred. To ensure that a good comparison can be made, the rate at which frames are read must be high enough so that features captured in a previous frame are still present in the current frame, although not necessarily in the same position.

The LED may be pulsed on and off to control the exposure for altering the average amount of light which reaches the array of photodetectors. Pulsing the LEDs also has the benefit of reducing power consumption as the LED is not always turned on and drawing power.

Power consumption is an important factor generally in optical pointing devices, but especially in wireless optical pointing devices. A wireless optical pointing device is usually powered by batteries, and therefore the power consumed by the device directly relates to the length of time that the batteries will last before requiring recharging or replacing.

SUMMARY OF THE INVENTION

According to a first aspect of the present invention an optical pointing device comprises at least one light source for illuminating a surface beneath the optical pointing device, a pixel array for receiving light reflected from the surface, and a frame readout device for reading information from the pixel array for producing a frame representing the light reflected from the surface. A motion processor calculates from successive frames motion of the optical pointing device, and a variable frame rate controller controls the rate at which the frame readout means produces frames.

The optical pointing device may further comprise a variable reference current generator to provide a reference current wherein the variable frame rate controller controls the variable reference current generator, and therefore controls the reference current.

The speed of operation of the frame readout device is dependent on the size of the reference current. A lower reference current causes the frame readout device to consume less power, and consequently, operate at a slower frame rate.

The variable reference current generator may comprise a plurality of current branches selectively operable by the variable frame rate controller. Alternatively, the variable reference current generator may comprise a voltage controlled current source.

The variable frame rate controller may vary the frequency of operation of the frame readout device by clock gating, i.e., based on a clock signal. The variable frame rate controller may receive at least one input signal indicating how the frame rate is to be adapted. The variable frame rate controller may receive an input signal indicating how the frame rate is to be adapted from a velocity monitor, or from a spatial frequency monitor, or both. The spatial frequency monitor acts to monitor high-frequency areas of a 2D discrete cosine transform from a MPEG (Moving Pictures Experts Group) algorithm.

According to a second aspect of the present invention a method for reducing power consumption in an optical pointing device comprises the steps of emitting light for illuminating a surface below the optical pointing device, detecting light reflected from the surface using a pixel array, and converting the detected light into a digital signal, and storing the digital light format into a frame. The method may further comprise calculating motion of the optical pointing device through comparison of successive frames, and varying the rate that frames are created.

Varying the rate may comprise varying a reference current for the readout means. The reference current may be varied by a plurality of current mirror branches. Alternatively, the reference current may be varied by a voltage controlled current source.

Alternatively, varying the rate comprises modifying the rate that frames are created by clock gating. The method may further comprise the step of providing at least one frame rate signal indicating how the rate of frame creation is to be varied. The frame rate signal may be a function of the velocity of the optical pointing device, or may be produced by monitoring spatial frequency of the surface below the optical pointing device, or both.

BRIEF DESCRIPTION OF THE DRAWINGS

An embodiment of the present invention will now be described with reference to the accompanying drawings, in which.

DETAILED DESCRIPTION OF THE PREFERRED EMBODIMENTS

Figure 1:
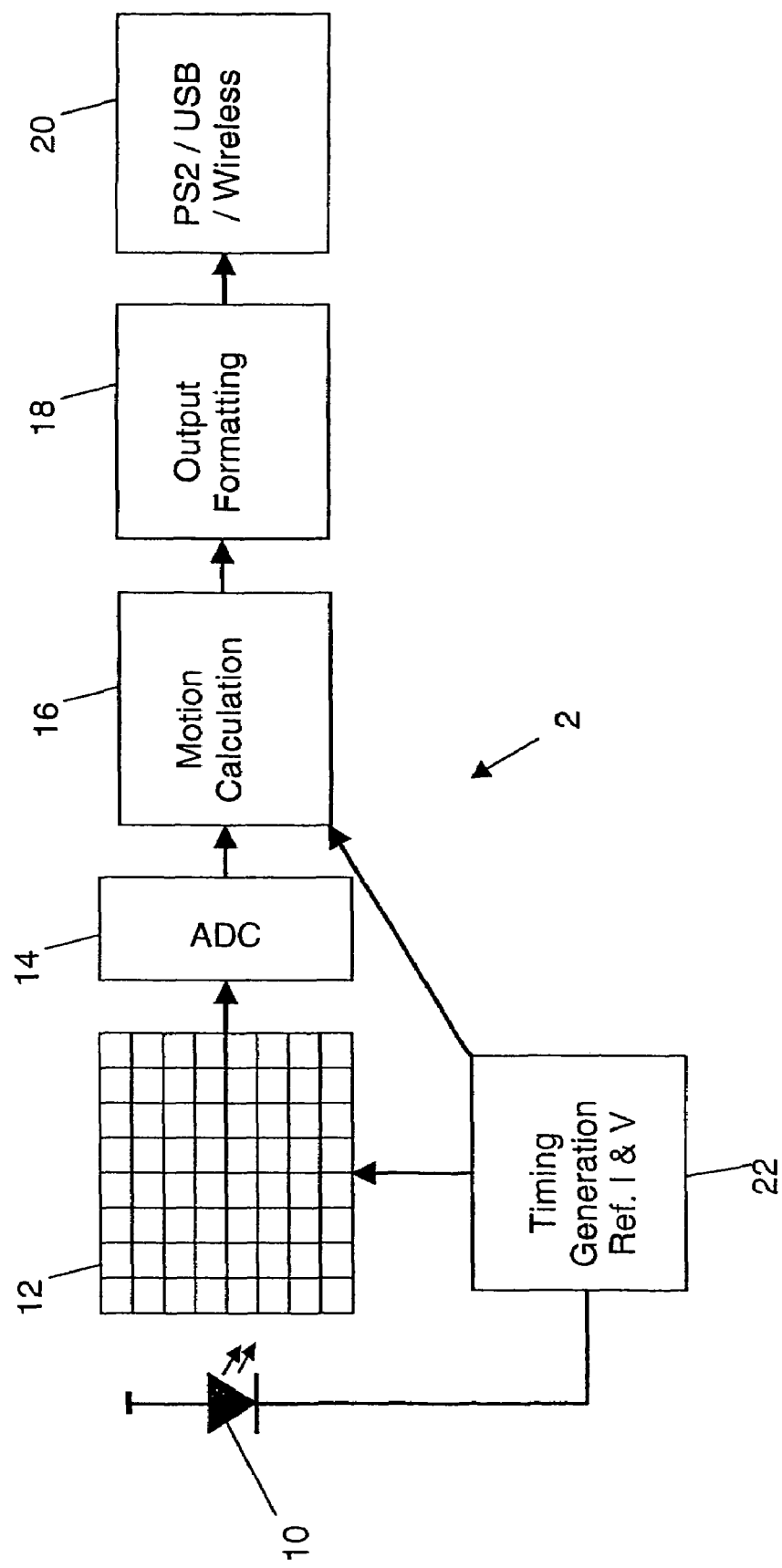
FIG. 1 shows a schematic view of a prior art optical pointing device.

Referring now to FIG. 1 a prior art optical pointing device 2 has a light emitting diode (LED) 10 which emits light towards a surface (not shown) on which the optical pointing device 2 is situated. A pixel array 12 receives light reflected from the surface. In some systems, reflected light is focused and/or magnified appropriately onto the pixel array 12 to ensure that surface features are detected.

Light information contained on the pixel array 12 is read by an analog to digital converter (ADC) 14 and then forwarded for analysis to a motion calculation system 16 in the form of a frame. The motion calculation system 16 compares the current frame to a reference frame captured immediately previous to the current frame. If a reference frame is not available the system stores the current frame as the reference frame.

Motion information calculated by the motion calculation system 16 from the current frame and reference frame is then passed to output formatting device 18 before being transmitted in an appropriate manner via transmission means 20.

Each time the pixel array 12 is read by the ADC 14 the motion information is conveyed via the transmission means 20. To provide adequate sensitivity the pixel array 12 is to be read by the ADC 14 at a frame rate high enough to cope with changing conditions that degrade the ability of the motion calculation system to calculate the correct motion information.

Velocity of the optical pointing device 2 is important to the frame rate. If the optical pointing device 2 is moving too quickly then the comparison between the reference frame and the current frame will not give an indication of the direction the optical pointing device is moving since the feature on the reference frame will not be available on the current frame.

Regularity or irregularity of the surface on which the optical pointing device 2 is currently placed is also important to the frame rate. A regular surface has common features in different locations, and therefore, the current frame has the possibility of being in a number of positions when compared to the reference frame. To ensure that this effect is minimized the frame rate is to be kept high.

A timing generator 22 provides control signals, including reference current and voltage signals, which dictate the frame rate of the optical pointing device 2. One or more of the control signals are also provided to the motion calculation system 16 and the LED 10. Since the pixel array 12 does not require continuously receiving reflected light, due to the interval between timing signals, the LED 10 is turned on and off as required by the control signals.

Figure 2:
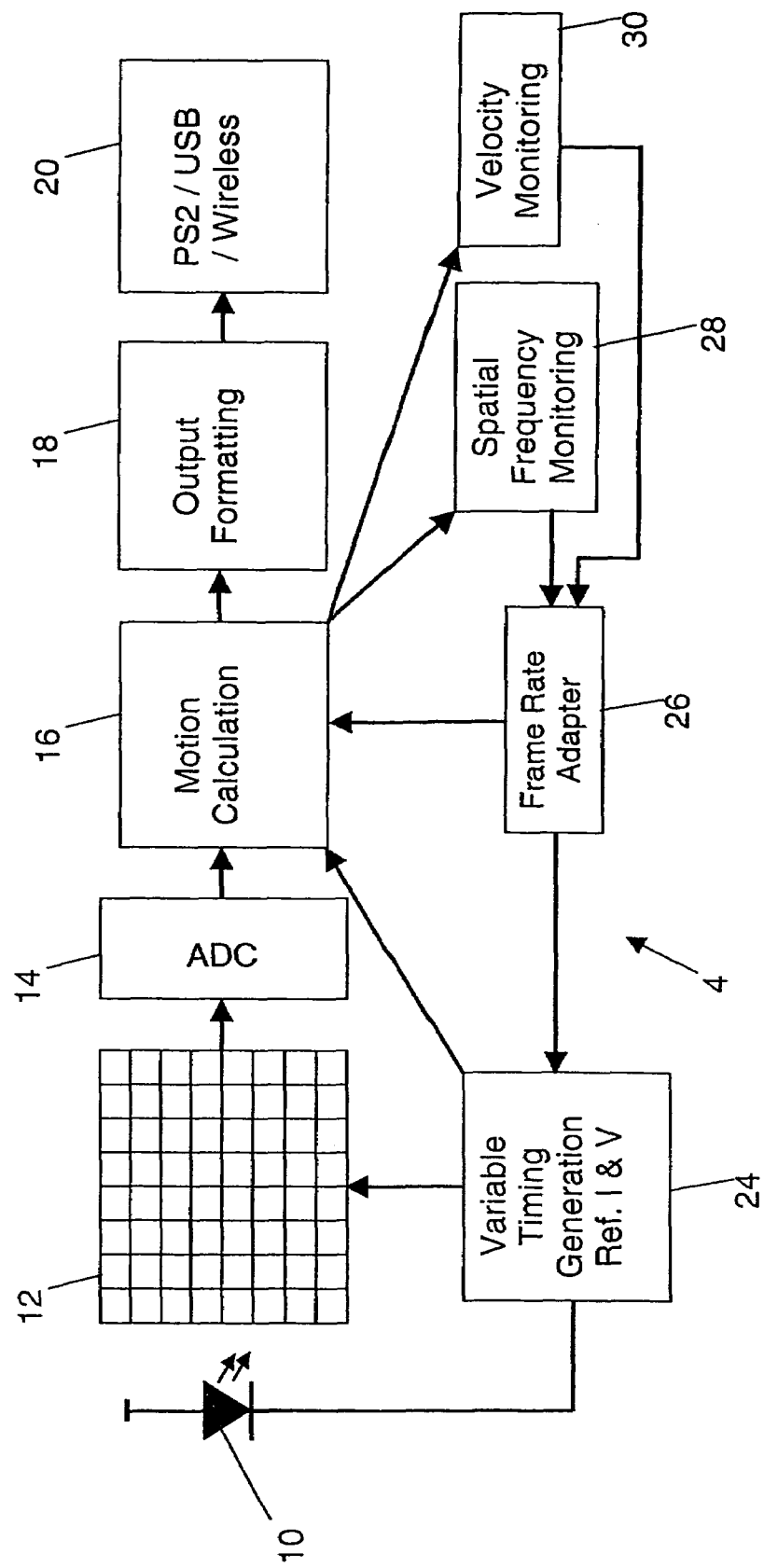
FIG. 2 shows a schematic view of an optical pointing device according to the present invention.

Referring now to FIG. 2, an optical pointing device 4 is shown in which some of the items as described in FIG. 1 are present and therefore are also numbered as in FIG. 1. The device of FIG. 2 provides motion information in the same manner as that described above, in that received light on the pixel array 12 is read out by the ADC 14 as a frame to the motion calculation system 16. The current frame is then compared to a reference frame captured immediately previous to the current frame. Motion information from this comparison is then passed for output formatting 18 and then transmission 20.

A variable timing generation system 24 is now available to the system and is controlled by a frame rate adapter 26. The frame rate adapter 26 receives information from a spatial frequency monitor 28 and a velocity monitor 30. Both of these systems receive inputs from the motion calculation system 16 which may include the current frame and/or reference frame information.

The spatial frequency monitor 28 provides information with respect to the surface on which the optical pointing device 4 is situated. In particular, it uses an MPEG (Moving Pictures Expert Group) algorithm to retrieve a two-dimensional discrete cosine transform (DCT) array. If a surface has a regular pattern, coefficients associated with high frequency components in the DCT array are more significant, and therefore, the system can suffer from aliasing problems if there is a low frame rate. If the surface has an irregular pattern, coefficients of high frequency components in the DCT array are less significant and aliasing problems at lower frame rates are minimized.

When an irregular surface is identified by the spatial frequency monitor 28, the frame rate adapter 26 modifies the variable timing generation system 24 to provide a lower frame rate. When a regular surface is identified by the spatial frequency monitor 28, the frame rate adapter 26 modifies the variable timing generation system 24 to provide a higher frame rate.

Figure 3:
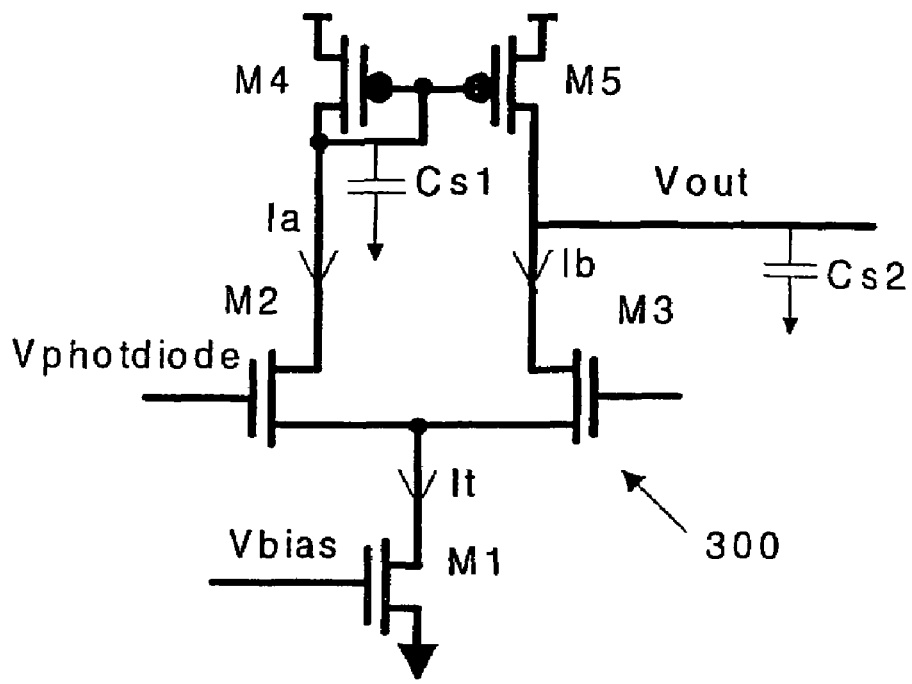
FIG. 3 shows an example circuit diagram of a standard comparator or operational amplifier as used in the present invention.
Figure 4:
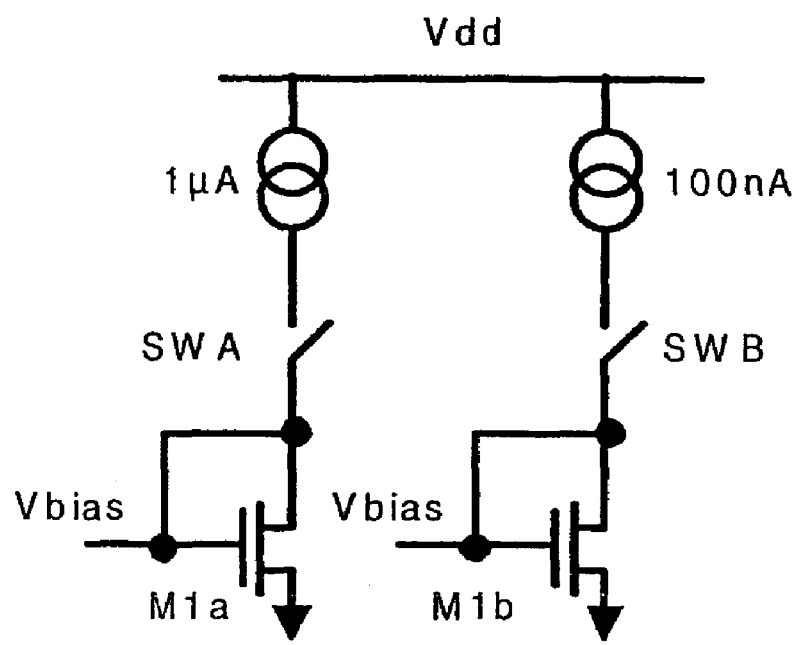
FIG. 4 shows an example circuit diagram of a variable reference current generator as used in the present invention.

The variable timing generation system 24 can modify the frame rate, effectively reducing the power consumption of the optical pointing device 4 in this example, in two ways. First, power saving in analog circuitry can be achieved by using the configuration as shown in FIG. 3 and FIG. 4. A standard building block of a comparator or operational amplifier 300 is shown. A complete circuit could be more complex and would include output stage and feedback circuitry. The optical pointing device 4 would have many of these building blocks. Often, the Vbias voltage would be common to them all. Applying a suitable, but constant voltage on the gate of M1 will cause a constant current to flow through the source of M1 (shown as It in FIG. 3). This will be independent of the voltages on the gates of M2 & M3. The sum of the currents Ia and Ib on each branch of the comparator 300 is the same as the current It (i.e., It=Ia+Ib). When the circuit switches (i.e., Vphotodiode<Vramp becomes Vphotodiode>Vramp), the currents Ia and Ib will change accordingly, and consequently the output Vout will change. This current needs to be sufficient to charge the stray capacitance, shown as Cs1 and Cs2 in FIG. 3, so that the voltage will slew, or change state, in a short enough period of time. Although stray capacitance can be minimized through careful layout, it can never be eliminated. Hence, the bias current (It) and bias voltage (Vbias) are chosen so that the output can change in a sufficiently short period of time as I=C×δV/δt.

The speed of operation of the circuit in FIG. 3 is largely determined by the current It, which flows through each of the building blocks. Although a straightforward circuit is shown in FIG. 3, this principle is applied to all analog circuit elements. If the device is to operate more slowly, the amount of current flowing through each analog building block can be reduced. A practical way of achieving this is shown in FIG. 4. This circuit uses a standard technique called current mirrors. The size of transistors M1a and M1b in FIG. 4 are the same as the transistor M1 in FIG. 3. For example, in a high-speed mode switch SWA is closed, and 1 µA flows through transistor M1a. Vbias is also connected to the gates of any current sources in the building blocks of the rest of the circuitry. Since only gates are connected, no current flows as the impedance of a CMOS gate is very high, typically greater than 1012 ohms.

The voltage on the gate of M1a will rise to the point where the 1 µA flows through the transistor M1a. This is the voltage that will allow 1 µA current to flow though a transistor of this size in this technology. As the size of M1a is equivalent to M1b and M1, then 1 µA will flow through all the other circuit elements.

When the motion monitoring techniques shown in FIG. 2 indicates that the device need not operate so quickly and power saving is possible, SWA is opened and SWB is closed. Now, the only current that flows is the 100 nA (i.e., 10 times less than before) through transistor M1b. The voltage on node Vbias changes to ensure that Vgs of M1 is such that 100 nA flows. As shown earlier, since this voltage is applied to all the gates of similar transistors M1 in the respective building blocks on the device, they will all pass 100 nA of current. If there are M sets of the circuit elements as shown in FIG. 3, the current consumption will fall from the product of M and 1 µA, to M and 100 nA.

FIG. 4 illustrates a method with two different settings for the reference current. This technique could be extended to several different current branches. A practical maximum could be 10. For a greater range of settings, the switched current mirror would be replaced by a voltage controlled current source.

The velocity monitor 30 provides information on the optical pointing device's velocity. If a low velocity is detected it is not necessary to have a high frame rate to ensure that surface features appear on both the reference frame and the current frame, and therefore the frame rate may be reduced. The frame rate adapter 26 receives information regarding the velocity of the optical pointing device, and slows the frame rate for low velocities and increases the frame rate for high velocities.

Varying the frame rate of the optical pointing device varies the power consumption of the device as the device uses power in relation to the amount of processing required. Enabling the frame rate to be lowered when required allows the optical pointing device to reduce the amount of processing required and, in turn, its power consumption while still providing motion information.

That which is claimed is:

1. An optical pointing device comprising:
   at least one light source for illuminating a surface adjacent the optical pointing device;
   a pixel array for receiving light reflected from the surface;
   a frame readout circuit for reading information from said pixel array for producing a frame representing the light reflected from the surface;
   a motion processor for calculating, from successive frames, motion of the optical pointing device;
   a spatial frequency monitor for providing information with respect to the surface adjacent the optical pointing device; and
   a variable frame rate controller for controlling a rate at which said frame readout circuit produces frames based on the information from said spatial frequency monitor.

2. An optical pointing device according to claim 1 further comprising a variable reference current generator for providing a reference current to control said frame readout circuit; and wherein said variable frame rate controller controls said variable reference current generator.

3. An optical pointing device according to claim 2 wherein said variable reference current generator comprises a plurality of current branches selectively operable by said variable frame rate controller.

4. An optical pointing device according to claim 2 wherein said variable reference current generator comprises a voltage controlled current source.

5. An optical pointing device according to claim 1 wherein said variable frame rate controller varies frequency of operation of said frame readout circuit based on a clock signal.

6. An optical pointing device according to claim 1 further comprising a velocity monitor for providing information on velocity of the optical pointing device; and wherein said variable frame rate controller further controls a rate at which said frame readout circuit produces frames based on the information from said velocity monitor.

7. An optical pointing device according to claim 1 wherein said spatial frequency monitor monitors high-frequency areas of a 2D discrete cosine transform from a moving pictures experts group (MPEG) algorithm.

8. An optical pointing device comprising:
   at least one light source for illuminating a surface adjacent the optical pointing device;
   a pixel array for receiving light reflected from the surface;
   a frame readout circuit for reading information from said pixel array for producing a frame representing the light reflected from the surface;
   a motion processor for calculating from successive frames motion of the optical pointing device;
   a variable reference current generator for providing a reference current to said frame readout circuit;
   a spatial frequency monitor for providing information with respect to the surface adjacent the optical pointing device; and
   a variable frame rate controller for controlling a rate at which said frame readout circuit produces frames based on the information from said spatial frequency monitor.

9. An optical pointing device according to claim 8 wherein said variable reference current generator comprises a plurality of current branches selectively operable by said variable frame rate controller.

10. An optical pointing device according to claim 8 wherein said variable reference current generator comprises a voltage controlled current source.

11. An optical pointing device according to claim 8 wherein said variable frame rate controller varies frequency of operation of said frame readout circuit based on a clock signal.

12. An optical pointing device according to claim 8 further comprising a velocity monitor for providing information on velocity of the optical pointing device; and wherein said variable frame rate controller further controls a rate at which said frame readout circuit produces frames based on the information from said velocity monitor.

13. An optical pointing device according to claim 8 wherein said spatial frequency monitor monitors high-frequency areas of a 2D discrete cosine transform from a moving pictures experts group (MPEG) algorithm.

14. A method for reducing power consumption in an optical pointing device comprising:
   emitting light for illuminating a surface adjacent the optical pointing device;
   detecting light reflected from the surface using a pixel array;
   converting the detected light into a digital signal, and storing the digital signal in a frame;
   calculating motion of the optical pointing device through comparison of successive frames;
   using a spatial frequency monitor for providing information with respect to the surface adjacent the optical pointing device; and
   varying a rate that frames are created based on the information from the spatial frequency monitor.

15. A method according to claim 14 wherein the optical pointing device comprises a frame readout circuit for performing the converting; and wherein varying the rate comprises varying a reference current for the frame readout circuit.

16. A method according to claim 15 wherein the reference current is varied by a plurality of current mirror branches.

17. A method according to claim 15 wherein the reference current is variable by a voltage controlled current source.

18. A method according to claim 14 wherein varying the rate comprises modifying the rate that frames are created based on a clock signal.

19. A method according to claim 14 further comprising using a velocity monitor for providing information on velocity of the optical pointing device; and wherein varying the rate that frames are created is further based on the information from the velocity monitor.

* * * * *